United States Patent [19]

Lange

[11] 4,083,060
[45] Apr. 4, 1978

[54] CAMERA MECHANISM PROVIDING FOR RELATIVE MOVEMENT OF COMPONENTS AGAINST FRICTIONAL RESISTANCE

[75] Inventor: Karl Heinz Lange, Bunde, Germany

[73] Assignee: Balda-Werke Photographische Gerate & Kunststoff GmbH. & Co. KG, Bunde, Germany

[21] Appl. No.: 608,793

[22] Filed: Aug. 28, 1975

[30] Foreign Application Priority Data

Sep. 26, 1974 Germany .............................. 2445990

[51] Int. Cl.² ............................................... G03B 17/12
[52] U.S. Cl. .................................. 354/286; 354/212; 354/288; 354/354; 188/83
[58] Field of Search ............... 354/195, 197, 198, 212, 354/286, 288, 289, 283, 285, 354, 202; 242/71.4, 71.6; 264/271, 328; 188/83

[56] References Cited

U.S. PATENT DOCUMENTS

| 1,984,544 | 12/1934 | Pearlman | 354/354 |
|---|---|---|---|
| 2,221,030 | 11/1940 | Mihalyi | 354/286 |
| 2,425,104 | 8/1947 | Luce | 188/83 |
| 2,699,230 | 1/1955 | Pflazgraff et al. | 188/83 |
| 2,854,099 | 9/1958 | Damon | 188/83 |
| 2,859,919 | 11/1958 | Debrie | 188/83 |
| 2,874,914 | 2/1959 | Kaden et al. | 242/71.6 |
| 3,057,278 | 10/1962 | Zill | 354/289 |
| 3,061,222 | 10/1962 | Beach | 242/71.6 |
| 3,220,308 | 11/1965 | Lareau | 354/195 |
| 3,842,620 | 10/1974 | Scozzafava | 188/83 |

FOREIGN PATENT DOCUMENTS 931,887  7/1963  United Kingdom ................ 354/286

Primary Examiner—L. T. Hix
Assistant Examiner—Alan Mathews
Attorney, Agent, or Firm—Blum, Moscovitz, Friedman & Kaplan

[57] ABSTRACT

A camera mechanism provides for motion of a metal component relative to an injection-molded plastic component. The parts are so formed that contraction of the plastic subsequent to injection-molding grips the metal component tightly enough to hold said components in fixed position relative to each other so far as accidental relative displacement is concerned, while permitting relative motion when enough force is applied to overcome the frictional resistance threbetween. The mechanism is particularly suitable for use in focussing the camera, that is, changing the distance between the lens housing and the film plane.

9 Claims, 7 Drawing Figures

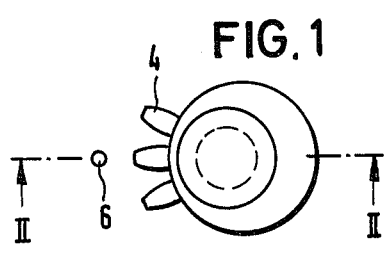
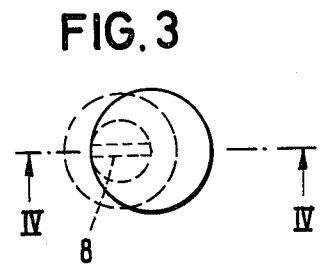
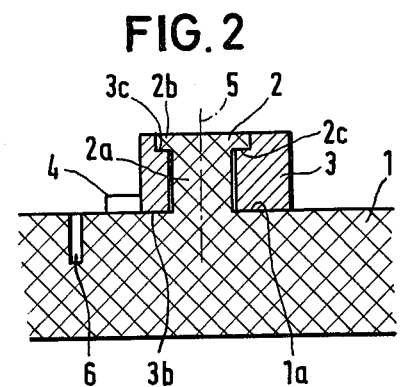
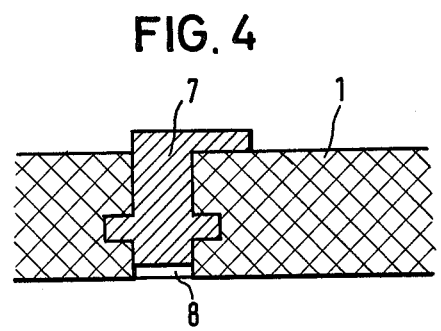
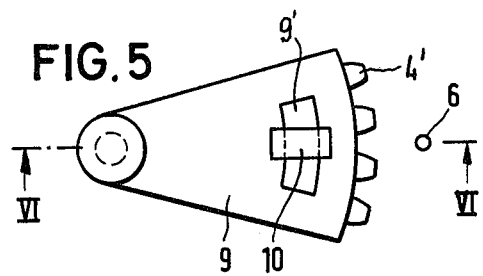
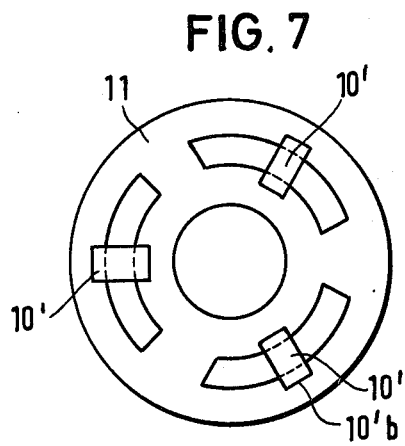
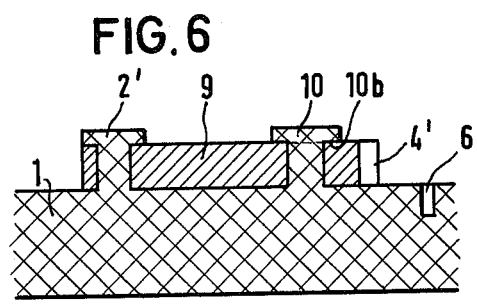

CAMERA MECHANISM PROVIDING FOR RELATIVE MOVEMENT OF COMPONENTS AGAINST FRICTIONAL RESISTANCE

BACKGROUND OF THE INVENTION

A common means of providing for the focussing of cameras, such focussing requiring motion of the lens housing with respect to the film plane, is to fit to a lens housing a rotatable disk having circular slots arranged upon an arc of a circle, said slots being penetrated by metal rivets. The metal rivets clamp the disk against accidental rotation, and displacement of the lens housing. The camera is adjusted by rotating the regular plate with the aid of teeth on the periphery thereof. The rivets are of metal, as aforenoted, and the contact pressure between the rivet and the regulating plate, and the consequent resistance to rotation, are difficult to maintain within appropriate limits.

The conventional mechanism, involving as it does the relatively sensitive lens housing, is both difficult and expensive to execute. Also, as aforenoted, it is difficult to hold the contact pressure to the required narrow tolerance. Nevertheless, a means for adjusting the position of a variety of components within a camera body is needed where the means is such that the components can be moved relative to each other without too much difficulty and yet which is such that the components will remain in the selected position despite accidental disturbance. Further, the means should be inexpensive, easy to fabricate, and safe to use in combination with the sensitive lens housing and compact. Moreover, the design should be such that it can be carried out on a production scale.

SUMMARY OF THE INVENTION

A camera mechanism which includes components which can be moved relative to each other and which will remain in fixed position once adjusting forces are no longer applied, is achieved by combining a metal component and an injection-molded plastic component which engage each other for relative motion and which are so formed that the contraction of the plastic component which takes place during cooling subsequent to injection-molding results in compressive force against the metal component, the force being sufficient to provide substantial frictional resistance against movement of one of said components relative to the other, the frictional resistance being such that it can be overcome manually or by use of an appropriate tool and yet sufficient to prevent unintentional or accidental relative movement of the two components.

To provide appropriate engaging surfaces, it is desirable that one of the components should at least partly encircle the other, and that the shapes of the components should be such that contraction of the plastic injection stock on cooling should bring interfaces between the two types of materials into engagement.

The present invention therefore utilizes a specific property of plastics and renders superfluous expensive auxiliary installations or equipment. An example of a combination comprising a mechanism in accordance with the present invention is a lens housing of plastic and a metal ring or gudgeon which clamp together as the plastic cools. The frictional force therebetween is sufficiently great to hold the combination in place after the initial adjustment is made in mounting the lens housing in the camera body.

Accordingly, an object of the present invention is a camera mechanism which is inexpensive and which provides for precise positioning of components relative to each other.

Another object of the present invention is a camera mechanism which utilizes the contraction of plastic to provide frictional engagement between components of the camera, the frictional force being such that intentional motion of components relative to each other can be instituted but accidental motion is prevented.

A further object of the present invention is a camera mechanism wherein components can be moved relative to each other precisely and positively by the use of an appropriate tool or manually and wherein said components will remain fixed in position, held by frictional engagement between said components.

A significant object of the present invention is a method of manufacture of a camera mechanism including the step of injection molding a plastic about a metal component in a form such that on cooling of the plastic frictional engagement between the plastic component and the metal component will result.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a plan view of a toothed metal gudgeon surrounding a plastic boss on a plastic base, said base and plastic gudgeon being integral;

FIG. 2 is a sectional view along line II — II of FIG. 1;

FIG. 3 is a plan view of a metal gudgeon embedded in a plastic member;

FIG. 4 is a sectional view along line IV — IV of FIG. 3;

FIG. 5 is a plan view of a regulator segment;

FIG. 6 is a sectional view along line VI — VI of FIG. 5;

FIG. 7 is a plan view of a regulating plate;

It should be noted that in FIGS. 1, 3, 5 and 7, the plastic base under the regulating segment or plate is not shown.

DESCRIPTION OF THE PREFERRED EMBODIMENTS

As shown in FIGS. 1 and 2, a plastic base 1 has an essentially cylindrical boss 2 integrally molded therewith. The boss 2 has an end portion molded into a collar 2b of larger diameter than the remainder 2a of the boss 2. Surrounding the boss 2 is a toothed ring or gudgeon 3 having lower and upper surfaces 3b and 3c respectively. To manufacture this mechanism, the plastic component 1 is injection-molded with the metal components 3 in place in the mold. As the plastic cools it contracts at a rate much greater than that of the metal as a result of which the cylindrical surface 2a of boss 2 shrinks away from the cylindrical interior of metal ring 3. However, end surfaces 3b and 3c of ring 3 as the result of the contraction, frictionally engage surfaces 1a and 2c respectively, thereby providing against accidental displacement of ring 3 relative to boss 2.

Ring 3 is provided with teeth 4 and plastic member 1 has therein a recess 6, the axis (not shown) of said recess being parallel to axis 5 of said boss 2. The shaft of a toothed tool (not shown) can be inserted in recess 6 for engagement of the teeth of said tool with teeth 4, thereby providing for positive and precise rotation of ring 3 relative to plastic member 1 against the frictional force of the described engaging surfaces. This force, by proper dimensioning of the plastic and ring in a manner known to those skilled in the art and by proper selection of the material of which the plastic consists, will be sufficient to hold ring 3 in place against accidental displacement and yet permit relative motion between components 2 and 3 when so desired. It will be noted that the toothed tool is essentially a sprocket-wheel key which works after the manner of a drill chuck key, such tools being commonly available. Also, since the metal ring sits eccentrically upon boss 2, rotation of ring 3 provides cam action which can be used as, for instance, for displacement of a lens housing.

FIGS. 3 and 4 show a construction which is essentially the converse of that in FIGS. 1 and 2. Here a metal gudgeon 7 is molded into a plastic component 1. Contraction of plastic component 1 on cooling results in engagement between the inner cylindrical surface of component 1 and the outer cylindrical surface of component 7. Also, the transverse surfaces of the collar on the essentially cylindrical portion of member 7 engage mating surfaces of plastic member 1. For convenient rotation of gudgeon 7 a slot 8 is provided at the lower end of gudgeon 7.

A further embodiment of the invention is shown in FIGS. 5 and 6 in which a segment 9 is capable of rotation about a collared boss 2'. Segment 9 has a slot 9' therein through which protrudes a second boss 10 having a collar or flange 10b thereon. Once more, segment 9 can be moved positively and precisely by the use of a sprocket key positioned through the use of recess 6, the teeth of the sprocket key making contact with teeth 4' on the periphery of segment 9. The clamping action provided by collar 10b and base 1 against segment 9 provides the frictional engagement which resists accidental and unintentional displacement of segment 9.

FIG. 7 shows a plate 11 in which the concept of FIG. 6 is extended, circular plate 11 having three circular slots therein through which protrude three fingers 10' each having a collar 10'b thereon for clamping ring 11 in place relative to base 1 (not shown in this Figure).

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Camera mechanism comprising a camera body, a metal component associated with said camera body, a plastic component injection-molded about said metal component, said metal component being movably held in said plastic component, said plastic component having opposing surfaces and said metal component having a surface engaging said opposing surfaces of said plastic component for relative motion therebetween, said plastic component applying a compressive force to said metal component as the result of the greater shrinkage of plastic than metal subsequent to injection molding, whereby frictional resistance to movement of said metal component relative to said plastic component is generated, said frictional resistance being great enough to prevent accidental movement of said metal component relative to said plastic component.

2. The camera mechanism as defined in claim 1, wherein said plastic component is a lens housing having an axis and being movably mounted in said camera body and wherein said metal component is capable of rotation relative to said camera body by application of a force sufficient to overcome the frictional resistance between said lens housing and said metal component.

3. The camera mechanism as defined in claim 1, wherein said plastic component comprises a base, a cylindrical shaft extending from said base, and a collar on said shaft, said collar being spaced apart from said base, and said base, shaft and collar being integral; and said metal component is a hollow cylinder mounted for rotation on said shaft, said cylinder having two ends, and the length of said cylinder and the spacing between said collar and said base being such that said collar and said base engage said ends of said cylinder with substantial frictional resistance.

4. The camera mechanism as defined in claim 1, wherein said metal component is mounted for rotation relative to said camera body and has an axis of rotation and two surfaces extending transversely to said axis, and said plastic component is so formed as to movably engage said surfaces with substantial frictional resistance to relative motion.

5. The camera mechanism as defined in claim 1, wherein said metal component has thereon means for use in positive and precise positioning of said member.

6. The camera mechanism as defined in claim 5, wherein said means consists of teeth, engageable by an appropriate tool.

7. The camera mechanism as defined in claim 5, wherein said camera body has therein a recess for receiving the shaft of a tool for engaging said means.

8. The camera mechanism as defined in claim 4, wherein said metal component has an arm extending transversely to said axis of rotation, said arm having a circular slot therein centered on said axis of rotation, and said plastic component has an integral boss extending through said slot, said boss having a flange thereon bearing frictionally against said arm.

9. The camera mechanism as defined in claim 1, wherein said plastic component has an essentially cylindrical recess, said recess having an annular enlargement at a region spaced apart from a surface of said plastic component, and said metal component is a gudgeon having an essentially cylindrical portion having an annular enlargement, the surface of said annular enlargement of said gudgeon mating in frictional engagement with said enlargement of said annular recess.

* * * * *